United States Patent [19]

Yamagishi et al.

[11] Patent Number: 4,792,853
[45] Date of Patent: Dec. 20, 1988

[54] VIDEO SIGNAL PROCESSING DEVICES

[75] Inventors: Youichi Yamagishi, Tokyo; Makoto Takayama, Kawasaki, both of Japan

[73] Assignee: Canon Kabushiki Kaisha, Tokyo, Japan

[21] Appl. No.: 855,733

[22] Filed: Apr. 25, 1986

[30] Foreign Application Priority Data

May 15, 1985 [JP] Japan ............................ 60-103072
May 20, 1985 [JP] Japan ............................ 60-105895

[51] Int. Cl.$^4$ ............................................. H04N 5/08
[52] U.S. Cl. ............................................. 358/153; 358/148
[58] Field of Search .............. 358/150, 153, 148, 152, 358/160, 909, 158, 296, 140

[56] References Cited

U.S. PATENT DOCUMENTS 3,906,155 9/1975 Van Straaten ................. 358/158
4,608,602 8/1986 Grantham-Hill ............... 358/148

FOREIGN PATENT DOCUMENTS 0037977 3/1982 Japan ............................ 358/160

Primary Examiner—James J. Groody
Assistant Examiner—David E. Harvey
Attorney, Agent, or Firm—Fitzpatrick, Cell, Harper & Scinto

[57] ABSTRACT

A video signal processing device for separating horizontal and vertical synchronizing signal components from an applied video signal, for forming a field discrimination signal upon discriminating the field represented by each field video signal on the basis of the separated horizontal and vertical synchronizing signal components, and for detecting abnormality or deviation from a predetermined variation in the field discrimination signal due to a defect of the synchronizing signal components or a different type or format of a video signal.

17 Claims, 7 Drawing Sheets

VIDEO SIGNAL PROCESSING DEVICES

BACKGROUND OF THE INVENTION

1. Field of the Invention

The present invention relates to video signal processing devices and, more particularly, to video signal processing devices adapted for processing synchronizing signal components which have been separated from a composite video signal having horizontal and vertical synchronizing signal components which define various video fields.

2. Description of the Prior Art

FIG. 1 shows a known synchronizing signal processing device of the kind referred to above. As shown in FIG. 1, a composite synchronizing signal Sync, which has been separated from a composite video signal, is inputted to the synchronizing signal processing device and is supplied to a horizontal synchronizing signal separation circuit 1 and a vertical synchronizing signal separation circuit 2. The horizontal synchronizing signal separation circuit 1 and the vertical synchronizing signal separation circuit 2 produce, respectively, a horizontal synchronizing signal HD and a vertical synchronizing signal VD. The horizontal synchronizing signal HD and the vertical synchronizing signal VD are supplied to a field discrimination circuit 3 so that the latter produces a field discrimination signal FD. As shown at (B) in FIG. 2, when the composite synchronizing signal Sync is generated by a 2 field-1 frame interlaced scanning system and is in proper synchronism (i.e. when its condition is normal), the field discrimination signal FD is produced in a certain relationship to the vertical synchronizing signal VD shown at (A) in FIG. 2, i.e., in a certain relation to odd number fields and even number fields of the composite synchronizing signal Sync which has been separated from the 2 field-1 frame video system signal. That is, the level of the field discrimination signal FD, shown at (B) in FIG. 2, corresponds to the field of the composite video signal. Thus the two fields of a 2 field-1 frame video system signal produce, alternatively, two different levels of the field discrimination signal FD. However, when there is any omission in the composite synchronizing signal Sync or when any noise is included in the composite synchronizing signal Sync, abnormal states are caused in the field descrimination signal FD as shown at (C) or (D) in FIG. 2.

An example of a known device for processing a video signal of this kind will be explained hereinunder in connection with FIG. 3 in which the same reference numerals are used to denote the same constituent elements appearing in FIG. 1.

An inputted composite video signal is supplied to a composite synchronizing signal separation circuit 11 in which the composite synchronizing signal Sync is separated from the inputted video signal. The separated composite synchronizing signal Sync is delivered to the horizontal synchronizing signal separation circuit 1 and to the vertical synchronizing signal separation circuit 2. These circuits 1 and 2 in turn separate and output the horizontal synchronizing signal HD and the vertical synchronizing signal VD. The separated vertical synchronizing signal is represented at (a) in FIG. 4. These synchronizing signals HD and VD are delivered to the field discrimination circuit 3 which then produces the field discrimination signal FD ((B) in FIG. 4) as explained before.

The horizontal synchronizing signal HD, the vertical synchronizing signal VD and the field discrimination signal FD are delivered, together with the inputted composite video signal, to a video signal processing circuit 12. The video signal processing circuit 12 processes the inputted video signal in accordance with the horizontal synchronizing signal HD, the vertical synchronizing signal VD and the field discrimination signal FD; and supplies the resulting processed signals to an output system. It may be assumed here, for example, that a printer device is used as the output system.

If the composite video signal is of the conventional 2 field-1 frame interlaced scanning type, it is subjected to an analog-to-digital conversion. The digital video signal is then transmitted to a memory in the video signal processing circuit 12, after a discrimination between the video signal of a first (odd number) field and the video signal of a second (even number) field according to the level of the field discrimination signal FD. The addresses in the memory are allotted depending on the type of the video signal. For instance, if the memory is a line memory which corresponds to picture elements on a line extending in the vertical direction on the outputted or displayed picture, odd number addresses are alloted to the video signals of the odd number fields, while even number addresses are alloted to the video signals of the even number fields. In case of a video printer, if the field discrimination signal FD has become abnormal as stated before, the printer cannot perform correct printing: that is, the quality of the printed picture is deteriorated seriously.

In recent years, there has been an increasing need to process video signals of the non-interlace scanning type, such as those outputted from a microcomputer, as well as video signals of the interlaced scanning type, such as those used for television. If video signals of the non-interlaced type are inputted to a device of the type shown in FIG. 3, the field discrimination circuit 3 undesirably judges that all the video signals belong to either one of the odd number fields and even number fields as shown at (C) or (D) in FIG. 4. That is the level of the output FD of the field discrimination circuit 3 remains the same for each successive field of the video signal.

When a printer device is used as the output system, the result is that the only scanning lines which are printed are those corresponding to the odd number fields or those corresponding to the even number fields, but not both. Alternatively, the scanning lines corresponding either to the odd number fields or to the even number fields may be printed correctly, but the scanning lines corresponding to the other fields are printed erroneously. Needless to say, the quality of the outputor printed picture is seriously deteriorated in both cases.

SUMMARY OF THE INVENTION

Accordingly, an object of the present invention is to provide a video signal processing device which can overcome the above-described problems of the prior art.

Another object of the present invention is to provide a video signal processing device which is capable of detecting of an abnormal state of field discrimination signal due to a defective synchronizing signal component or components, or a different type or format of a video signal.

According to one aspect of the invention there is provided a novel device for processing video signals having horizontal and vertical synchronizing signal components which define video fields. This novel device comprises first and second signal separation means, field discrimination signal generating means and detection means. The first signal separation means separates horizontal synchronizing signal components from applied video signals and the second signal separation means separates vertical synchronizing signal components from the applied video signals. The field discrimination signal generating means is connected to receive the horizontal and vertical synchronizing signal components separated by the first and second signal means and to produce in response thereto, field discrimination signals which correspond, respectively, to associated video fields. The detection means is connected to the output of the field discrimination signal generating means and operates to produce an output signal when the field discrimination signals deviate from a predetermined pattern.

Still another object of the invention is to provide a signal processing device which enables an output device to operate according to both interlaced and non-interlaced type composite video signals.

In an aspect the present invention which fulfills this last mentioned object, there provided a novel device for processing video signals having horizontal and vertical synchronizing signal components which define video fields. This novel device comprises first and second signal separation means, field discrimination signal generating means, dummy signal generating means, output means and switch means. The first signal separation means separates horizontal synchronizing signal components from applied video signals and the second signal separation means separates vertical synchronizing signal components from the applied video signals. The field discrimination signal generating means is connected to receive the horizontal and vertical synchronizing signal components separated by the first and second signal separation means and to produce in response thereto field discrimination signals which correspond, respectively, to associated video fields. The dummy signal generating means is connected to the second signal separating means to receive the vertical synchronizing signal components and to produce in response thereto a series of signals which simulate interlaced type field discrimination signals. The output means operates according to interlaced type field discrimination signals and the switch means is arranged to alternately connect the outputs of the field discrimination signal generating means and the dummy signal generating means to the output means.

The present invention also includes, in other aspects, further and more specific features as are described in the specification and set forth in detail in the claims.

DETAILED DESCRIPTION OF THE PREFERRED EMBODIMENTS

The embodiments of the present invention will be described in detail hereinunder with reference to the accompanying drawings.

Figure 1:
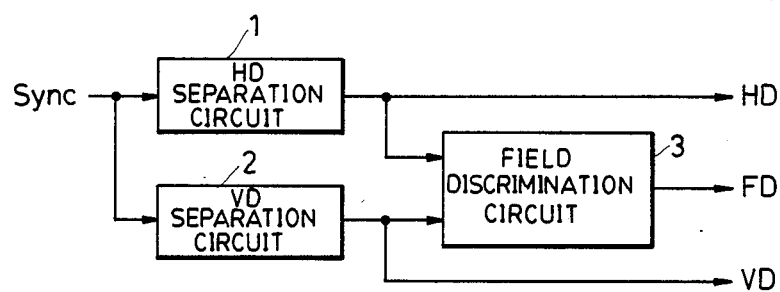
FIG. 1 is a block diagram of a known synchronizing signal processing device.
Figure 2:
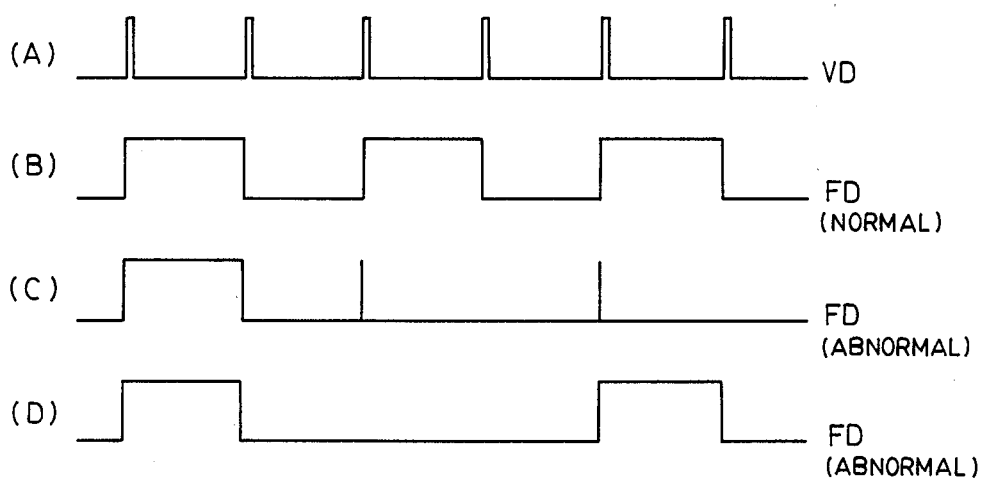
FIG. 2 is a timing chart showing waveforms of signals appearing in different portions of the circuit shown in FIG. 1.
Figure 3:
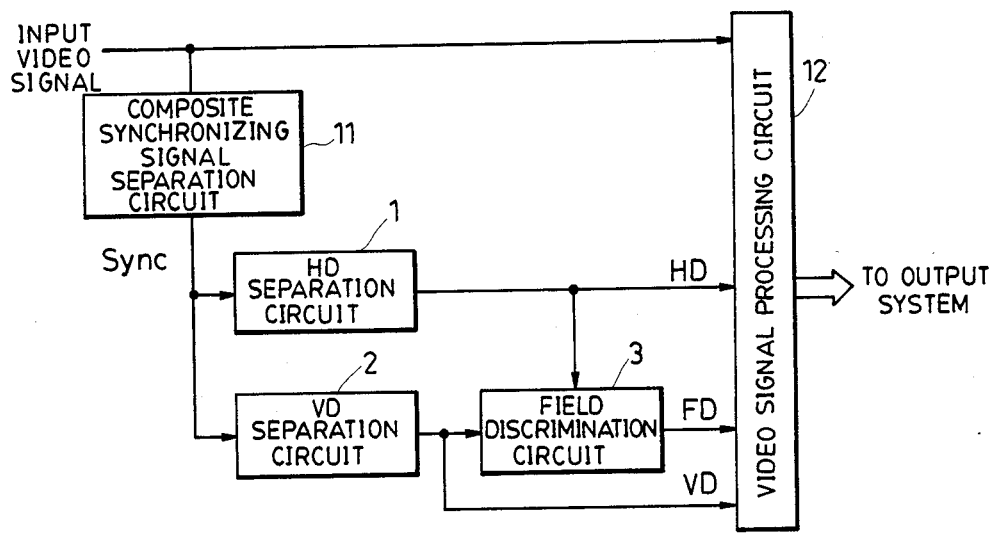
FIG. 3 is a block diagram of a known video signal processing device.
Figure 5:
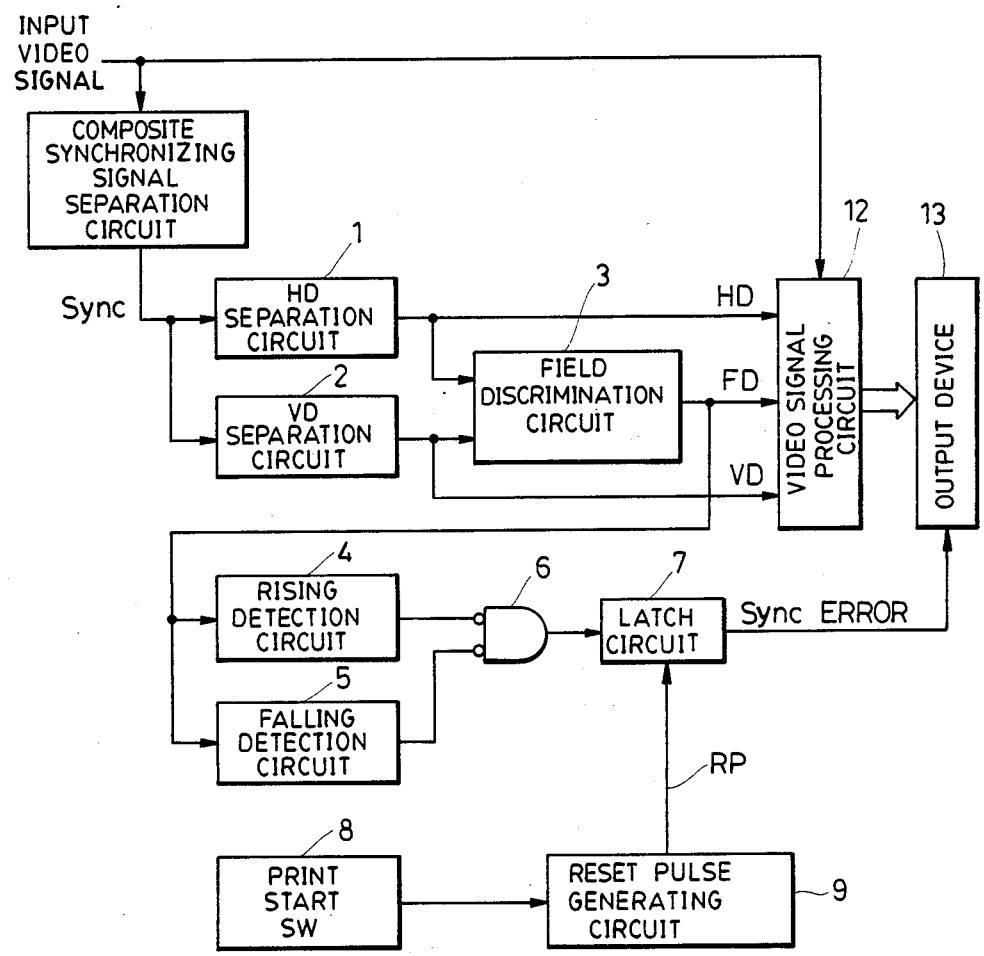
FIG. 5 is a block diagram of a video signal processing device comprising one embodiment of the present invention.

Referring first to FIG. 5 showing a block diagram of an embodiment of the present invention, a composite synchronizing signal Sync is delivered from a composite synchronizing signal separation circuit 11, to a horizontal synchronizing signal separation circuit 1 and a vertical synchronizing signal separation circuit 2, so that a horizontal synchronizing signal HD and a vertical synchronizing signal VD are separated and outputted. These synchronizing signals HD and VD are supplied to a field discrimination circuit 3 which in turn produces field discrimination signals FD. This arrangement as thus far described is basically the same as that of the conventional device explained before in connection with FIGS. 1 and 3.

In this embodiment, the field discrimination signals FD are inputted to a rising or leading edge detection circuit 4 and a falling or trailing edge detection circuit 5. Each of the detection circuits 4 and 5 is constituted by a circuit, for example, a monostable multivibrator, which is capable of producing pulses of a predetermined pulse width. This pulse width is predetermined to be longer than the period of the vertical synchronizing signal VD but shorter than twice this period. Thus, in the case of a 2 field-1 frame video system the pulse width is greater than the duration of one field scan but less than the duration of one frame scan.

The output from the rising edge detection circuit 4 and the output from the falling edge detection circuit 5 are inputted to an AND gate 6. The AND output from the AND gate 6 is latched by a latch circuit 7 which in turn outputs, when there is any defect, such as omission in the field discrimination signals FD, a synchronization error signal Sync Error.

This synchronization error signal Sync Error may be used to prohibit, when an output device 13 is a video printer, the printing operation or print output, thereby avoiding outputting of print which otherwise may cause a deterioration of the picture quality due to synchronization error. The error signal Sync Error also may be used to indicate the defective field discrimination signal or the defective synchronizing signal other than the controlling of the operation of the output device.

A reference numeral 8 designates a print start switch, while a numeral 9 designates a reset pulse generating circuit. For printing video information, the operator turns the print start switch 8 on, so that a print start signal is delivered to the reset pulse generating circuit 9. In response to the print start signal, the reset pulse generating circuit 9 produces a latch reset signal i.e., a reset pulse RP which is inputted to the latch circuit 7, whereby a synchronization error signal Sync Error is initialized or made low at each start of printing.

The operation of the signal processing device shown in FIG. 5 will be explained with reference to FIG. 6.

Figure 6:
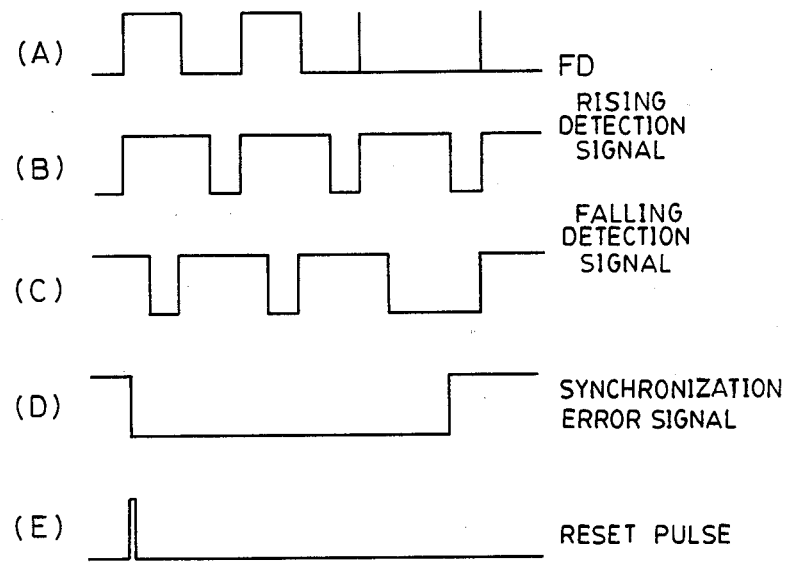
FIG. 6 is a timing chart illustrating the operation of various parts of the device shown in FIG. 5.

In FIG. 6, (A) shows the field discrimination signals FD outputted from the field discrimination circuit 3 in which some of pulses are omitted, due to some defect, for example, excessive noise in the composite video signal. As the defective field discrimination signals FD are inputted to the rising detection circuit 4 and the falling edge detection circuit 5, rising edge and falling edge detection signals as shown at (B) and (C) in FIG. 6 are produced by the detection circuits 4 and 5, respectively. These rising edge and falling edge detection signals are inputted to an AND gate 6, the AND output of which is applied to the latch circuit 7. Such AND output causes the latch circuit 7 to produce a high synchronization error signal Sync Error as shown at (D) in FIG. 6. This synchronization error signal Sync Error is initialized or made low by a reset signal produced from the reset pulse generating circuit 9 as shown at (E) in FIG. 6, each time the printing is started.

In the above described embodiment, the circuit for detecting abnormality in the field discrimination signals is constituted by the detection circuits 4 and 5 and the AND gate 6. This arrangement, however, is not exclusive and various other circuit arrangements can be used for the purpose of detection of abnormality in the field discrimination signals FD. For instance, the abnormality can be detected by integrating the pulses of the field discrimination signals FD and comparing the integrated value with a predetermined threshold value. It is also possible to detect abnormality in the field discrimination signals FD by sampling the field discrimination signals FD in synchronism with the vertical synchronizing signals VD, and counting the numbers of high level signals and low level signals in the sampling output.

Figure 7:
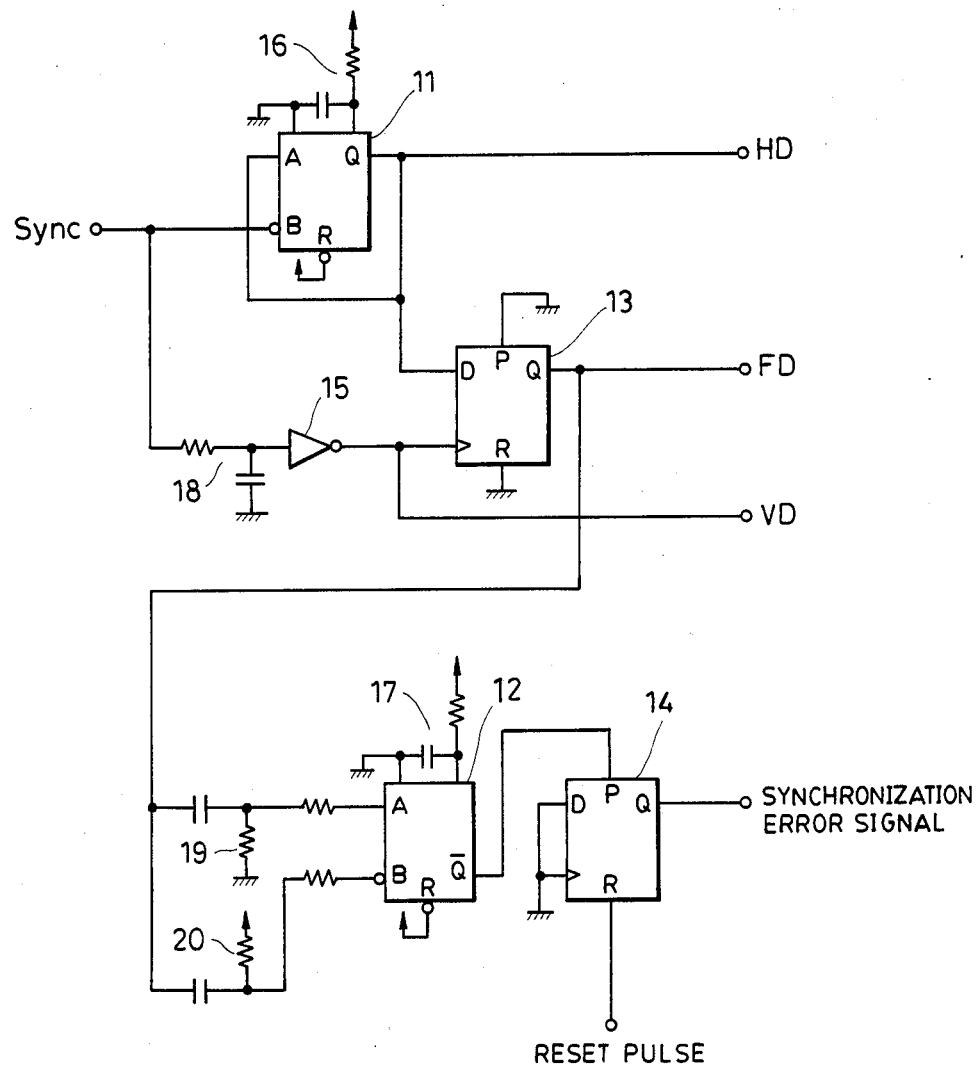
FIG. 7 is an illustration of an example of a circuit arrangement which performs the basic functions of the device shown in FIG. 5.

FIG. 7 shows the detail of an example of a circuit which may be used to carry out the functions represented by the blocks in FIG. 5.

The circuit of FIG. 7 includes triggerable monostable multivibrators 31 and 32, D-type flip-flops 33 and 34, an inverter 15, and time-constant circuits 16 and 17 for determining time constants of the monostable multivibrators 31 and 32. The time-constant circuit 16 sets a time corresponding to the pulse width of the pulse of the horizontal synchronizing signals HD as the time constant of the monostable multivibrator 31, while the time-constant circuit 17 sets a time which is between the period of the vertical synchronizing signals VD and twice that period, as the time constant of the monostable multivibrator 32. In the described embodiment, as shown in FIG. 6, the time constant of the monostable multivibrator 32 is selected to be one and a half times the period of the vertical synchronizing signals VD. The circuit shown in FIG. 7 further includes an integration circuit 18 which serves as a low-pass filter for extracting the vertical synchronizing signals VD from the composite synchronizing signal Sync, and also differentiator circuits 19 and 20 for detecting the rising or leading edges and the falling or trailing edges, respectively, of the field discrimination signals FD.

Each of the monostable multivibrators 31 and 32 is adapted to be triggered each time an input is applied to its input terminal A or B and produces an output pulse of a predetermined duration. A predetermined voltage is applied to each reset terminal R of each monostable multivibrator 31 and 32 so as to avoid unintentional resetting of the multivibrator. The reset terminal R and the preset terminal P of the flip-flop 33 are grounded. The preset terminal P of the flip-flop 34 is connected to an output Q of the monostable multivibrator 32, while the reset terminal R of the same is connected to the output of the reset pulse generating circuit 9 (FIG. 5).

The inputted composite synchronizing signal Sync is delivered both to the monostable multivibrator 31 and the integration circuit 18. The monostable multivibrator 31 is triggered at each ½ H (H being equal to one horizontal scan period) so as to form the horizontal synchronizing signal HD, while the integration circuit 18 delivers its output to the inverter 15 thereby forming the vertical synchronizing signals VD. The flip-flop 33 receives the horizontal synchronizing signals HD at its terminal D and the vertical synchronizing signals VD at its clock input terminal, thereby producing the field discrimination signals FD. The output Q of the monostable multivibrator 31 is fed back to the input terminal A of this multivibrator 31, so that undesirable re-triggering of this multivibrator due to, for example, a noise is avoided.

The differentiator circuits 19 and 20 produce, upon detection of the rising or leading edges and the falling or trailing edges, respectively, of the field discrimination signals FD, the rising edge and the falling edge detection signals which alternately trigger the monostable multivibrator 32. Therefore, in case of an omission in the field discrimination signals FD as shown in (A) in FIG. 6, the output $\overline{Q}$ of the multivibrator 32 is changed to high level, so that the output Q of high level is derived from the flip-flop 34 which serves as the latch circuit 7. This state, however, is initialized to recover the low level, as the reset pulse RP is inputted to the flip-flop 34.

The above described signal processing device can effectively detect synchronization errors, so that the undesirable results which may otherwise be caused by synchronization error, e.g. print output of deteriorated picture quality, can advantageously be avoided.

Figure 8:
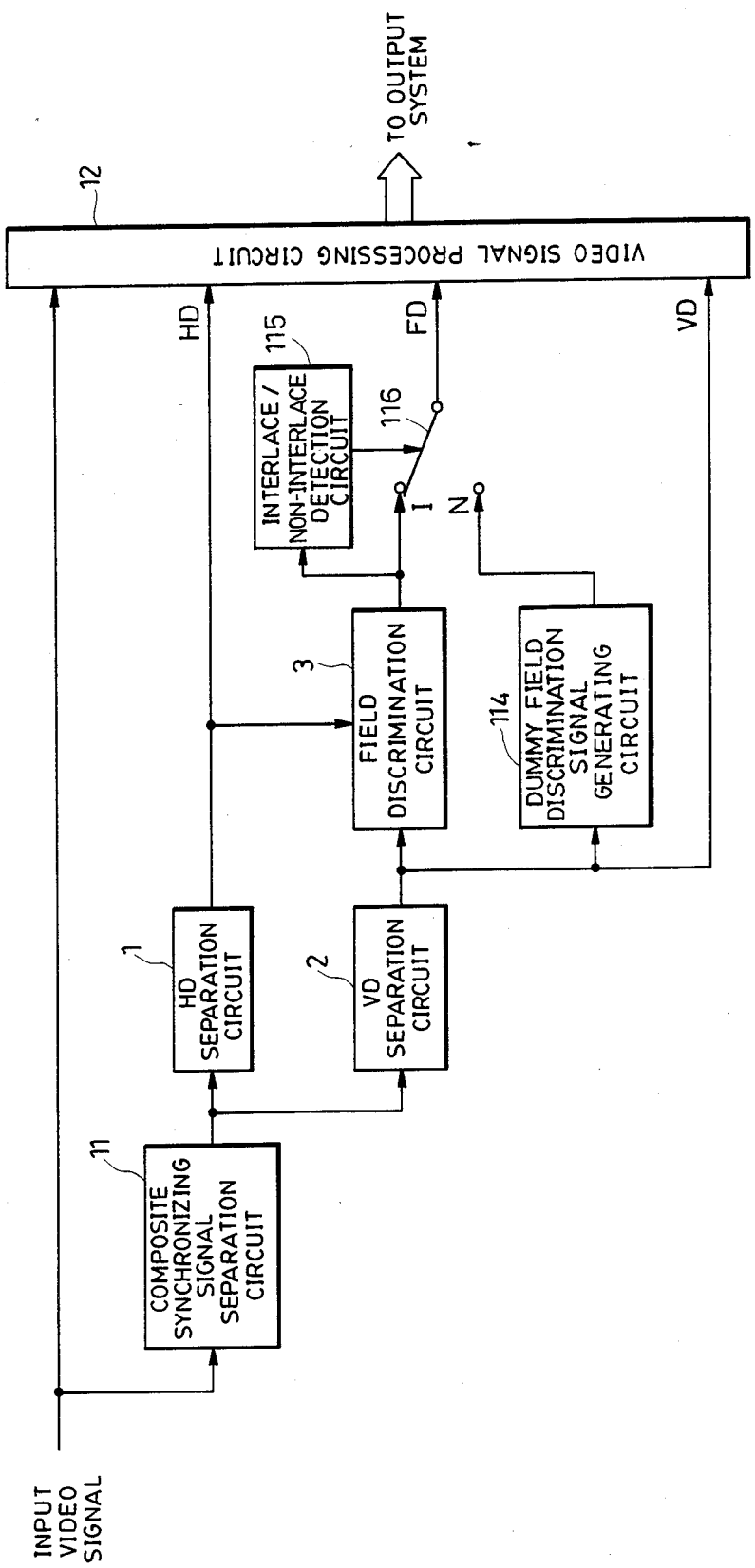
FIG. 8 is a block diagram of a video signal processing device comprising a second embodiment of the present invention.

FIG. 8 shows another embodiment of the video signal processing device of the present invention. In this Figure, the same reference numerals are used to denote the same constituent parts as those appearing in FIGS. 3 and 5, and description of such same parts is omitted.

In this embodiment, the field discrimination signals FD from the field discrimination circuit 3 are delivered both to an interlace/non-interlace detection circuit 115 and to the terminal I of a change-over switch 116 which is controlled by the output of the detection circuit 115. On the other hand, the vertical synchronizing signals VD from the VD separation circuit 2 are delivered to a dummy field discrimination signal generating circuit 114, so that substitutive or dummy field discrimination signals of the frame period are supplied to the terminal N of the change-over switch 116. The vertical synchronizing signals VD from the VD separation circuit 2 are also supplied to the field descrimination circuit 3 and to the video signal processing circuit 12 as in the preceding embodiment.

Figure 4:
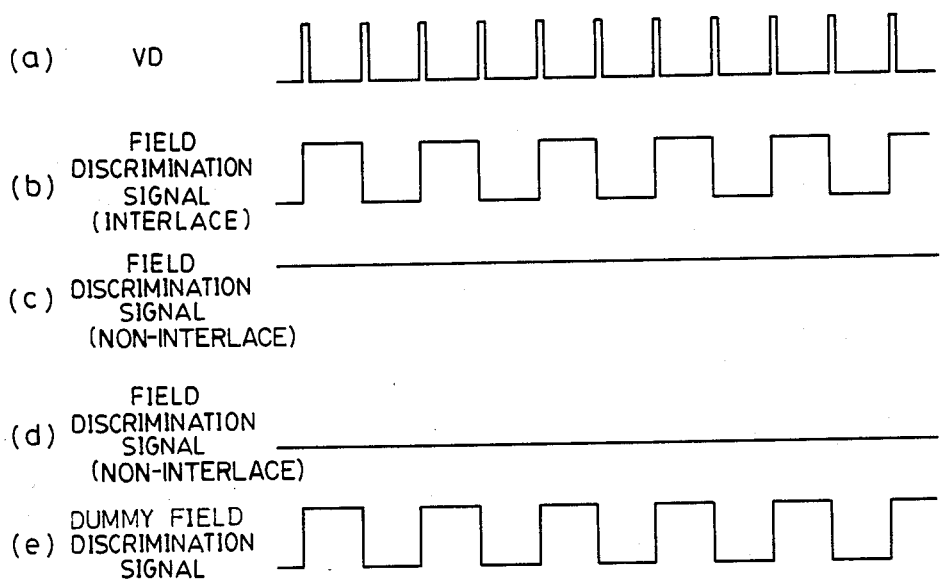
FIG. 4 is a timing chart showing waveforms of signals appearing in different portions of the device shown in FIG. 3, together with the waveform of a dummy field discrimination signal generated in embodiments of the present invention.

If the field discrimination signals FD are inverted for each field period (as represented by (B) in FIG. 4), the interlace/non-interlace detection circuit 115 judges that the video signals are of the interlaced scanning type, whereas, if not, the same judges that the video signals are of non-interlaced scanning type.

When the output from the interlace/non-interlace detection circuit 115 indicates that the video signals are of intelaced-scannings type, the change-over switch 116 selects the terminal 1 to pass the field descrimination signals FD (See (B) in FIG. 4) from the field discrimination circuit 3 to the video signal processing circuit 12. However, when the video signals are of non-interlaced scanning type, the output of the interlace/non-interlace detection circuit 115 causes the change-over switch 116 to select the terminal N, so that the periodical substitutive or dummy field discrimination signal (see (E) in FIG. 4) produced from the dummy signal generating circuit 114 passes through the change-over switch 116 to the video signal processing circuit 12.

It will be understood that, according to this arrangement, the substitutive or dummy field discrimination signals play the same role as the discrimination signals FD, when video signals of non-interlaced scanning type are received. In an apparatus having a printer device as its output system, therefore, the same data is printed on the scanning lines corresponding to the first and second fields, even if the received video signals are of non-interlaced type. That is, the same data is written in the addresses (2n) and (2n-1) of the vertical line memory mentioned before.

Figure 9:
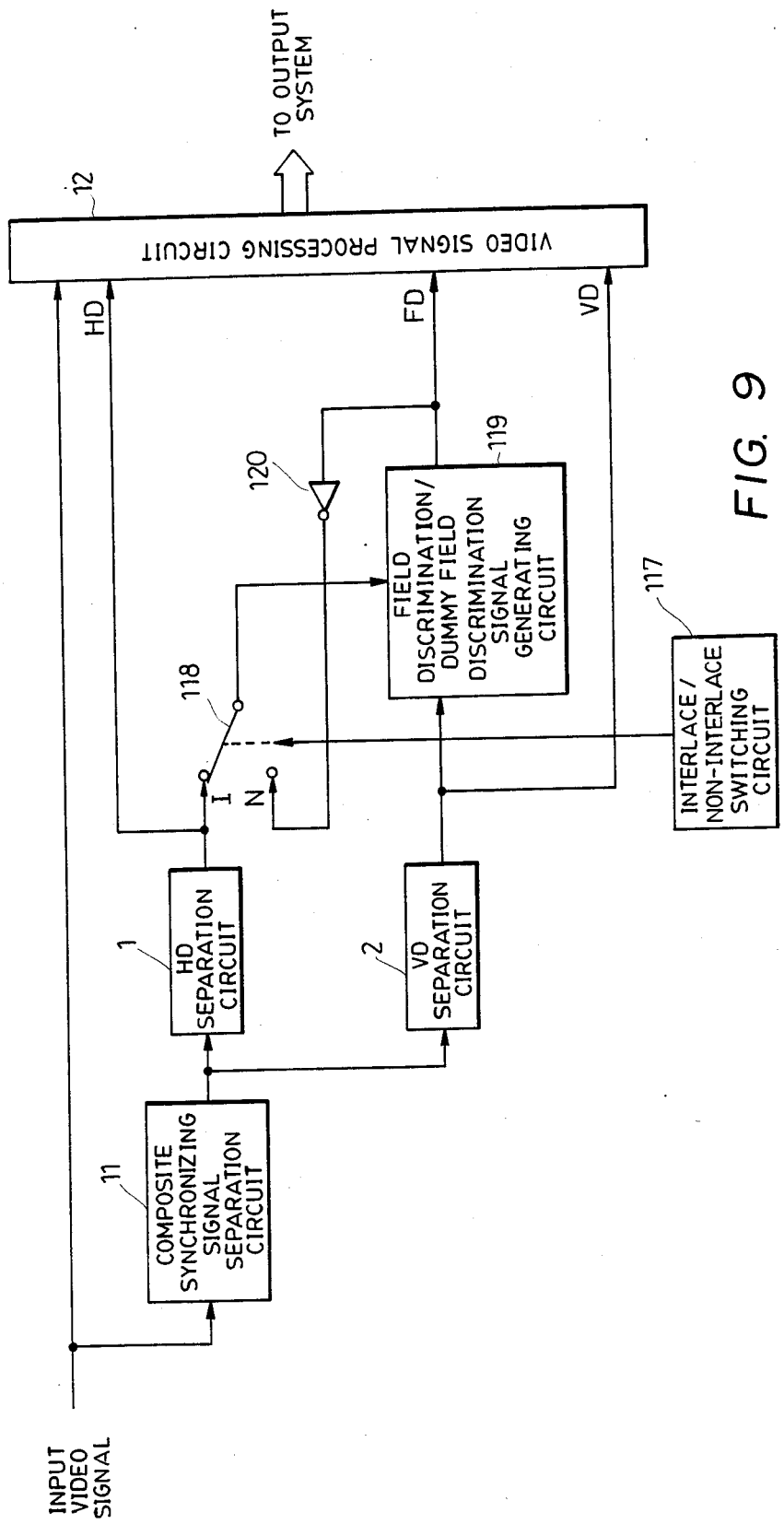
FIG. 9 is a block diagram of a video signal processing device comprising a third embodiment of the present invention.

FIG. 9 shows still another embodiment of the video signal processing device of the present invention. In this Figure, the same reference numerals are used to denote the same constituent parts, and description of such same parts is omitted.

In the embodiment of FIG. 9, the horizontal synchronizing signals HD from the HO separation circuit 1 are delivered to the terminal I of a change-over switch 118, while the vertical synchronizing signals VD from the VD separation circuit 2 are delivered to a field discrimination/dummy field discrimination signal generating circuit 119. The output from the circuit 119 is delivered, after an inversion by an inverter 120, to the terminal N of the switch 118. The switch 118 can be switched manually through an interlace/non-interlace change-over circuit 117. When the interlaced-scanning type is assigned manually through the change-over circuit 117, the switch 118 delivers the horizontal synchronizing signals HD to the field discrimination/dummy field discrimination signal generating circuit 119, whereas, when the non-interlaced scanning type is assigned, it delivers the output of the inverter 120 to the circuit 119. When the received video signals are of the interlaced scanning type, the field discriminating/dummy field discriminating signal generating circuit 119 plays the same role as the field discrimination circuit 3 shown in FIG. 3, so as to output the field discrimination signals FD. However, when the video signals are of non-interlace scanning type, the output of the circuit 119 is inverted by the inverter 120 each time the vertical synchronizing signals VD are received, whereby substitutive or dummy field discrimination signals of the frame period are produced.

Figure 10:
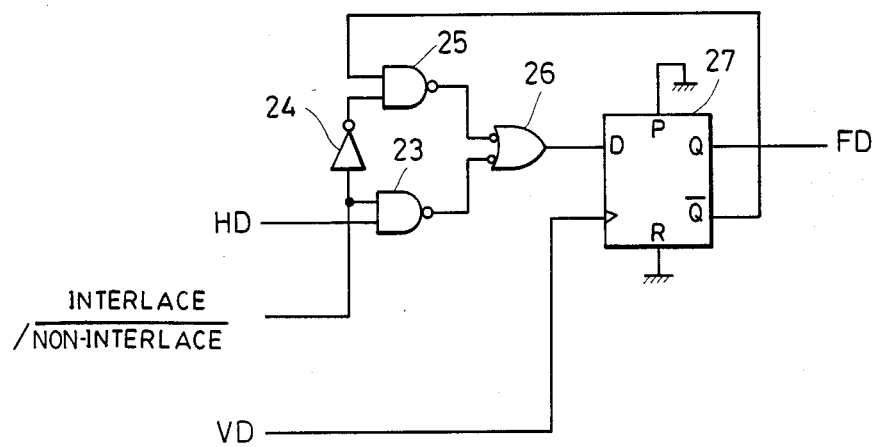
FIG. 10 is an illustration of a circuit arrangement which performs the basic functions of the device shown in FIG. 9.

FIG. 10 shows a practical circuit arrangement which performs the basic functions of the circuits 118 through 120 of FIG. 9. The circuit of FIG. 10 has an AND gate 23, an inverter 24, an AND gate 25, an OR gate 26, and a D-type flip-flop 27. When the interlaced scanning type is assigned through the circuit 117, i.e. when a high level signal is applied from the interlace/non-interlace change-over circuit 117 to the AND gate 23 and the inverter 24, the AND gate 23 supplies the horizontal synchronizing signals HD to the OR gate 26. Since the level of the output from the inverter 24 is low, the level of the output from the AND gate 25 also is low, so that the horizontal synchronizing signals HD are delivered to the terminal D of the D-type flip-flop 27. In this case, therefore, the D-type flip-flop 27 serves as a field discrimination circuit. Namely, in the first field, the timing of signals HD and VD coincide with each other, so that the output Q of the flip-flop 27 takes a high level, whereas, in the second field, the timing of both synchronizing signals HD and VD are staggered by an amount equal to half the period of the horizontal scanning (H), so that the output Q takes the low level. This output Q, therefore, can be used as the field discrimination signals FD.

Conversely, when the non-interlaced signal is assigned through the circuit 117, a low level signal is applied from the interlace/non-interlace change-over circuit 117 to the AND gate 23 and the inverter 24. As a result, the AND gate 23 does not pass the horizontal synchronizing signals HD, so that its output always takes the low level. On the other hand, the AND gate 25 delivers the output $\overline{Q}$ of the D-type flip-flop to the OR gate 26. Consequently, the output $\overline{Q}$ of the D-type flip-flop 27 is inverted each time the vertical synchronizing signal VD is received. In this case, therefore, the D-type flip-flop 27 serves as the substitutive or dummy field discrimination signal generating circuit.

It will be clear to those skilled in the art that the arrangement shown in FIGS. 9 and 10 provides the same advantages as those offered by the embodiment shown in FIG. 8.

As has been described, according to the present invention, it is possible to avoid any unfavourable effect on the output of a video signal processing circuit which may otherwise be caused by a synchronization error. In addition, an optimum synchronization signal processing can be conducted regardless of whether the input video signals are of interlaced scanning type or non-interlaced scanning type.

Although the invention has been described through its preferred forms, it is to be noted here that the described embodiments are only illustrative and various changes and modifications may be imparted thereto without departing from the scope of the present invention which is limited solely by the appended claims.

We claim:
1. A device for processing video signals having horizontal and vertical synchronizing signal components which define video fields, said device comprising:
   (a) first signal separation means for separating horizontal synchronizing components from applied video signals;
   (b) second signal separation means for separating vertical synchronizing signal components from said applied video signals;
   (c) field discrimination signal generating means connected to receive the horizotal and vertical synchronizing signal components separated by said first and second signal separation means and to produce in response thereto, field discrimination signals each having a characteristic which corre- sponds, respectively, to an associated video field; and (d) detection means connected to the output of said field discrimination signal generating means, said detection means being operative to produce an output signal when said field discrimination signals deviate from a predetermined pattern.

2. A device according to claim 1, wherein the characteristic of each of said field discrimination signals corresponds to the duration of the associated video field and wherein said predetermined pattern is uniformity of said characteristic among said field discrimination signals.

3. A device according to claim 2, wherein said characteristic is the duration of each field discrimination signal.

4. A device according to claim 3, wherein the level of each field discrimination signal corresponds to the associated video field.

5. A device according to claim 1, further comprising output means which operates according to said video signals and means for controlling the operation of said output means in response to the output signal from said detection means.

6. A device according to claim 2, further comprising output means which operates according to said video signals and means for disabling the operation of said output means in response to the output signal from said detecton means.

7. A device according to claim 6, wherein the level of each field discrimination signal corresponds to the associated video field and wherein said detection means comprises timing circuit means responsive to changes in level of said field discrimination signals to produce said output signal when the time between successive changes in the level of said field discrimination signals differs from a predetermined duration.

8. A device according to claim 7, wherein said field discrimination signal generating means produces alternate high and low level field discrimination signals during successive video fields, wherein said timing circuit means responds to level rises in said field discrimination signals to initiate first timing periods and responds to level drops in said field discrimination signals to initiate second timing periods, the first and second timing periods being of predetermined duration greater than the duration of one video field but less than twice the duration of one video field and wherein said timing circuit means produces said output signal when one of the first and second timing periods expires before the initiation of one of the first and second timing periods.

9. A device according to claim 8, wherein said timing circuit means comprises a monostable multivibrator having a time constant of a duration greater than the duration of one video field but less than twice the duration of one video field and wherein said timing circuit means further comprises differentiator circuits constructed to transmit the rises and falls in the level of said field discrimination signals to corresponding inputs of said multivibrator to initiate said first and second timing periods respectively.

10. A device according to claim 1, wherein the characteristic of each of said field discrimination signals corresponds to the interlaced position of the associated video field and wherein said predetermined pattern is the alternation of said characteristic among successive field discrimination signals.

11. A device according to claim 10, further comprising an output means which operates according to outputs from said field discrimination signal generating means when said characteristic alternates among successive field discrimination signals and switch means arranged to disconnect said output means from said field discrimination signal generating means in reponse to said output signal.

12. A device according to claim 11, further including a signal generator for generating signals having said characteristic which alternates successively in response to signals from said second signal separation means, said switch means being arranged to connect said signal generator to said output means when said output means is disconnected from said field discrimination signal generating means.

13. A device for processing video signals having horizontal and vertical synchronizing signal components which define video fields, said device comprising:

(a) first signal separation means for separating horizontal synohronizing signal components from applied video signals;

(b) second signal separation means for separating vertical synchronizing signal components from said applied video signals;

(c) field discrimination signal generating means connected to receive the horizontal and vertical synchronizing signal components separated by said first and second signal separation means and to produce in responce thereto, field discrimination signals which correspond, respectively, to associated video fields;

(d) dummy signal generating means connected to said second signal separating means for receiving said vertical synchronizing signal components and for producing in response thereto a series of signals which simulate interlaced type field discrimination signals;

(e) output means which operates according to interlaced type field discrimination signals; and (f) switch means arranged to selectively connect the outputs of the field discrimination signal generating means and the dummy signal generating means to said output means.

14. A device according to claim 13, further comprising detection means connected to the output of said field discrimination signal generating means, said detection means being operative to produce an output signal when said field discrimination signals deviate from a predetermined pattern, said switch means being arranged to be switched by said output signal from said detection means.

15. A device according to claim 14, wherein said field discrimination signlas have first and second patterns corresponding respectively to video fields of interlaced and non-interlaced type respectively, wherein said detection means produced said output signal in response to said second pattern and wherein said switch means operates in response to said output signal from said detection means to connect the output of said dummy signal generating means to said output means.

16. A device according to claim 13, wherein said field discrimination signal generating means produces field discrimination signals of different levels in response to horizontal and vertical synchronizing signal components corresponding to video fields of different interlace position and wherein said dummy signal generating means produces said series of signals comprising different levels.

17. A device according to claim 13, wherein said field discriminator signal generating means, said dummy signal generating means and said switch means comprise a D-type flip-flop having a clock input connected to receive the vertical synchronizing signal components from said second signal separation means, a D input, a Q output, and a $\bar{Q}$ output, a pair of AND gates having their outputs connected via an OR gate to said D input, one input of one AND gate connected to receive the horizontal synchronizing signal components from said first signal separating means, the other input of said one AND gate connected to receive a switching signal, a signal inverter connected to receive said switching signal and to apply an inverted version thereof to one input of the other AND gate and the other input of said other AND gate being connected to receive signals from said $\bar{Q}$ output.

* * * * *

UNITED STATES PATENT AND TRADEMARK OFFICE
CERTIFICATE OF CORRECTION

PATENT NO. : 4,792,853

DATED : December 20, 1988

INVENTOR(S) : YOUICHI YAMAGISHI ET AL.    Page 1 of 2

It is certified that error appears in the above-identified patent and that said Letters Patent is hereby corrected as shown below:

ON THE TITLE PAGE:

AT [56] REFERENCES CITED

Attorney, Agent or Firm, "Fitzpatrick, Cell, Harper & Scinto" should read --Fitzpatrick, Cella, Harper & Scinto--.

COLUMN 2

Line 27, "alloted" should read --allotted--.
    Line 28, "alloted" should read --allotted--.
    Line 55, "outputor" should read --output or--.
    Line 65, "of" (first occurrence) should be deleted.

COLUMN 3

Line 27, "provided" should read --is provided--.

COLUMN 6

Line 66, "descrimination" should read --discrimination--.

COLUMN 7

Line 9, "intelaced-scannings" should read --interlaced-scanning--.
    Line 10, "descrimination" should read --discrimination--.

UNITED STATES PATENT AND TRADEMARK OFFICE
CERTIFICATE OF CORRECTION

PATENT NO. : 4,792,853
DATED : December 20, 1988
INVENTOR(S) : YOUICHI YAMAGISHI ET AL.    Page 2 of 2

It is certified that error appears in the above-identified patent and that said Letters Patent is hereby corrected as shown below:

COLUMN 10

Line 19, "synohronizing" should read --synchronizing--.
    Line 28, "responce" should read --response--.
    Line 53, "signlas" should read --signals--.
    Line 56, "produced" should read --produces--.
    Line 65, "interlace" should read --interlaced--.

COLUMN 11

Line 2, "discriminator" should read --discrimination--.

Signed and Sealed this

Second Day of January, 1990

Attest:

JEFFREY M. SAMUELS

*Attesting Officer*    *Acting Commissioner of Patents and Trademarks*